United States Patent [19]

Golarz

[11] Patent Number: 4,542,286

[45] Date of Patent: Sep. 17, 1985

[54] TIME CARD AND CARRIER

[75] Inventor: Jeffrey Golarz, Ashburnham, Mass.

[73] Assignee: Simplex Time Recorder Co., Gardner, Mass.

[21] Appl. No.: 446,537

[22] Filed: Dec. 3, 1982

[51] Int. Cl.[4] .............................................. G06K 7/10
[52] U.S. Cl. ...................................... 235/377; 40/360; 235/493; 346/82; 360/88
[58] Field of Search ............... 235/377, 449, 493, 495; 346/82, 83, 84; 360/2, 88; 40/360, 156

[56] References Cited

U.S. PATENT DOCUMENTS

| | | | |
|---|---|---|---|
| 1,767,257 | 6/1930 | Rand | 40/360 |
| 1,816,261 | 7/1931 | Lombardini | 40/360 |
| 2,640,647 | 6/1953 | Rand | 235/493 |
| 3,740,759 | 6/1973 | McKeegan et al. | 346/82 X |
| 3,747,242 | 7/1973 | Heimann | 40/360 X |
| 4,011,434 | 3/1977 | Hockler | 235/377 |
| 4,017,857 | 4/1977 | Evans, Jr. et al. | 360/2 X |

Primary Examiner—David L. Trafton
Attorney, Agent, or Firm—Seidel, Gonda, Goldhammer

[57] ABSTRACT

A time card carrier has means for alterably storing employee identification, time and attendance data, and means for releasably retaining an employee time card having an imprintable portion. The time card has an extended tab portion for proper orientation of the card on the carrier. The time card carrier is reusable to allow a fresh time card to be inserted onto the time card carrier at the beginning of each new payroll period.

15 Claims, 4 Drawing Figures

TIME CARD AND CARRIER

BACKGROUND OF THE INVENTION

The present invention is directed to a reusuable time card carrier for use in connection with employee time recorders. In particular, the invention is directed to a reusuable time card carrier having means for releasably retaining an imprintable time card, and also having alterable information storage means for storing employee identification, time and attendance data.

Heretofore, time card carriers were not capable of storing alterable information such as employee identification and time and attendance data. Thus, U.S. Pat. No. 3,740,759 discloses a time card carrier bearing an employee identification number in the form of punched holes. The punched holes and, therefore, employee identification cannot be altered. Moreover, the card carrier is not capable of storing any other information such as summary time and attendance data.

Employee time cards having means for alterably storing summary time and attendance data are known. Pat. No. 4,017,857 discloses a time card having both a magnetic strip and an imprintable portion. Summary time data is stored on the magnetic strip and is also printed onto the imprintable portion when the time card is inserted into an appropriate time recorder. Eventually, the imprintable portion is filled, say at the end of an accounting or payroll period. The magnetic strip may or may not be filled, but it cannot be used any further since the filled card must be replaced by a new time card bearing a blank imprintable portion.

It is therefore desirable to provide a employee time card carrier which is capable of storing employee identification, time and attendance data for one or more time cards.

It is also desirable that the time card carrier be usable for one or more payroll or accounting periods.

It is further desirable that such a time card carrier be capable of releasably retaining each imprintable time card so that a printed record of the employee's attendance history can be placed on each time card and separately stored.

An advantage of the invention is that a current record of summary time data for one or more time cards can be stored on a single storage medium on the time card carrier.

A further advantage of the invention is that the medium is erasable and can be reused from one payroll or accounting period to another.

A further advantage of the invention is that each time card need only be provided with an imprintable portion for storage of a printed record of the employee's attendance history and need not contain other storage medium.

Other advantages appear hereinafter.

SUMMARY OF THE INVENTION

A time card carrier has means for releasably retaining an employee time and attendance card. The time card has an imprintable portion for printing employee time and attendance data such as time of last clock in or clock out, and summary time data. The time card carrier has a magnetic strip for alterably storing machine readable information including employee identification data, employee weekly schedule assignment, the time and nature of the last transaction and summary time data for the current payroll period.

The time card carrier magnetic strip is reusable. At the end of a payroll or accounting period, the magnetic strip may be erased and supplied with fresh information for the next payroll or accounting period. The old time card is removed, and a new blank time card is inserted into the card carrier retaining means at the beginning of each new payroll period.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
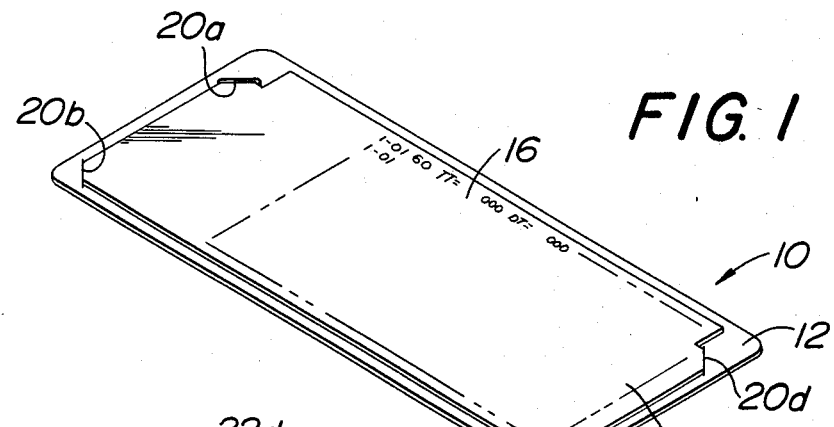
FIG. 1 is a perspective view of a time card retained by the time card carrier and illustrates the cooperation between the time card and the time card carrier.

With reference to the drawings, wherein like numerals indicate like elements, there is shown in FIG. 1 a time card carrier according to the present invention and a time card inserted therein, designated generally as 10. The time card carrier 12 is generally rectangular in shape. The time card 14 is of the conventional type having an imprintable portion 16. The time card 14 is also generally rectangular in shape but has a length and a width somewhat less than the overall length and width of the time card carrier 12.

Figure 3:
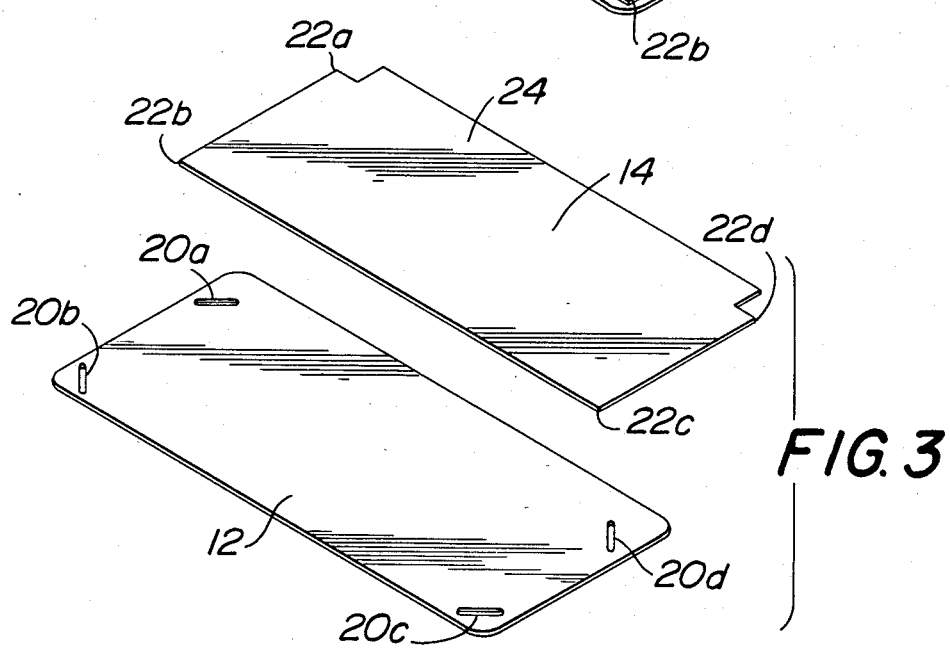
FIG. 3 is a perspective view of the card and carrier separated from each other and illustrates the cooperating elements of the card and carrier.

The time card carrier 12 contains four canted slots 20a, 20b, 20c and 20d each located adjacent to one of the card carrier corners. The four corners 22a, 22b, 22c and 22d of the time card 14 fit into and are slidably retained by appropriate ones of the canted slots 22a-d. As best seen in FIG. 3, time card 14 has an extending tab portion 24 which is somewhat shorter in length than the overall length of the card. This arrangement is employed to properly orient the card in canted slots 20a and 20d for printing such that the card does not interfere with a magnetic strip 18 on the card carrier 12, as will be explained hereafter.

Figure 2:
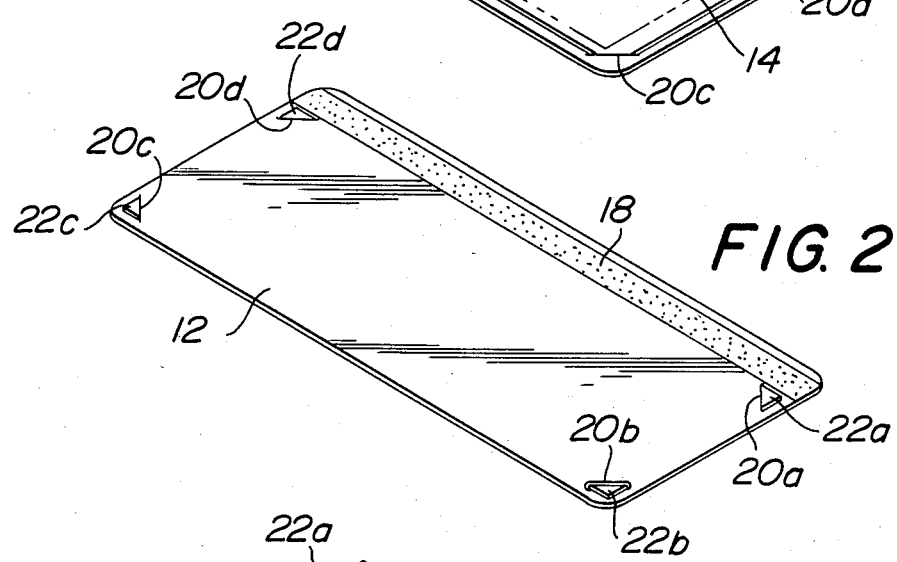
FIG. 2 is a perspective view of the opposite side of the time card carrier and illustrates the placement of the magnetic strip.

FIG. 2 shows the underside of time card carrier 12. The four canted slots 20a-d of the time card carrier are arranged to provide a margin along one side or edge of the carrier. In particular, the canted slots 20a and 20d are offset from their respective corners by a prescribed distance so as to provide the margin. The magnetic strip 18 is secured to the underside of the time card carrier 12 along the margin by conventional means such as adhesive. The strip 18 may be conventional magnetic tape usable for alterable storage of electronic data, such as audio cassette tape.

In use, the card 14 is inserted in the slots 20a-20d on the top side of the card carrier, and the card and carrier are inserted in a time recorder for printing such that the printer element faces the top side of the carrier. See FIG. 4. The underside of the carrier faces magnetic read and write heads in the recorder such that the magnetic strip 18 can be used to store machine readable information while the printer elements prints information on portion 16 of card 14. Information stored on strip 18 may be employee identification data, employee's weekly schedule assignments, the nature and time of the last transaction (time of last clock-in or clock-out) and summary time data, i.e. elapsed working time for the day and total attendance time for the payroll period. The magnetic strip 18 may store additional information such as payroll multipliers, allowable overtime, and "record type" information which indicates that the instrument on which the strip is located is a time card carrier.

FIG. 3 illustrates the cooperating elements of the time card 14 and the time card carrier 12. The four corners 22a-d of time card 14 are insertable into the four canted slots 20a-d such that the time card 14 is releasabaly retained in the slots and may be removed from the time card carrier 12 at specified intervals, as desired. The extending tab portion 24 of the time card overlays a portion of the margin defined by the card carrier edge and offset slots 20a and 20d. In use, the card must be placed on the top side of the card carrier opposite the underside on which the magnetic strip is located. If the card is mistakenly placed on the underside of the card carrier, the card tab portion 24 lies on the magnetic strip. In this orientation, the card cannot be imprinted by the printer element. Placement of the tab portion 24 over the magnetic strip provides a visual indication that the card has been inserted incorrectly in the card carrier and prevents use of the magnetic strip.

Figure 4:
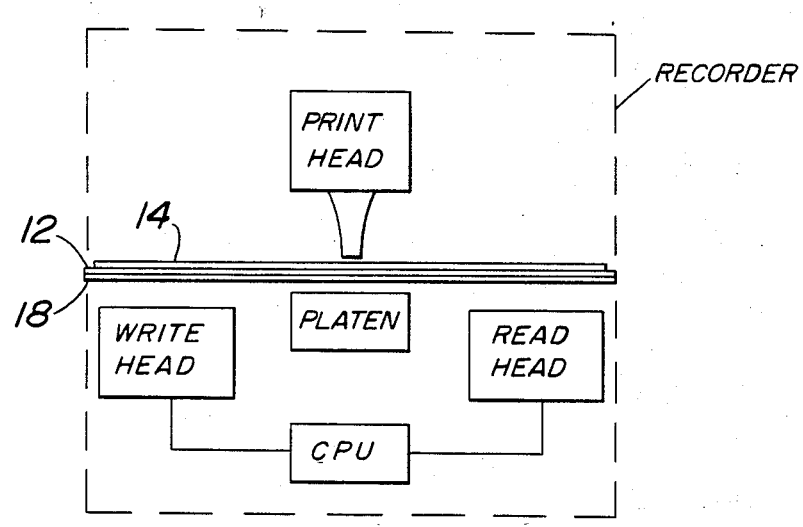
FIG. 4 is a diagram of the card carrier 12 and card 14 inserted in a time recorder for printing, information storage and retrieval.

The time card carrier is used as follows. At the beginning of a payroll period, the magnetic strip 18 is erased, new data relating to employee identification, allowable working hours, etc. is stored on the strip, and a new blank time card 14 is fitted into the four canted slots 20a-d. As shown in FIGS. 1-2 and 4, the imprintable portion of the time card faces up on the topside of the card carrier while the magnetic strip faces down on the underside of the carrier. The card and carrier are inserted in the time recorder. Printing occurs on the card on one face of the carrier while electronic storage on and retrieval of data from the magnetic strip occurs on the other face of the carrier. See FIG. 4. Each time that the card carrier 12 and card 14 are inserted in the time recorder, information is read from the magnetic strip by a magnetic read head in the recorder, the information is processed by the time recorder, and new information is written onto the strip by the magnetic write head. For each insertion of the card and carrier in the recorder, the printer element located within the time recorder prints time information upon the imprintable portion 16 of time card 14. The printed time information may include the nature and time of the last transaction, and summary time data for the day or the payroll period to date.

One or more time cards may be repeatedly used until filled with printed information during a particular payroll period. The magnetic strip stores information, as previously described, corresponding to the use of the one or more time cards during the payroll period. At the end of the payroll period, the time card or last time card is removed from the card carrier and the card carrier is fed through a magnetic tape reading device connected to a central processing unit for computation of total working hours and pay. At this time, the magnetic strip 18 is erased and fresh information is stored thereon. Thereafter, a new card is inserted in the carrier and information is recorded on the strip for each insertion as previously explained.

The present invention may be embodied in other specific forms without departing from the spirit or attributes thereof and, accordingly, reference should be made to the appended claims, rather than to the foregoing specification, as indicating the scope of the invention.

I claim:

1. A card carrier for an imprintable card, comprising:
    a. machine readable storage means for alterably storing data retrievable therefrom;
    b. retaining means for releaseably retaining the imprintable card in position on the carrier for printing on the card.

2. A card carrier according to claim 1 wherein the machine readable storage means comprises a magnetic storage medium.

3. A card carrier according to claim 2 wherein the magnetic storage medium comprises a strip of magnetic material along a margin of the card carrier.

4. A card carrier according to claim 1 wherein the retaining means comprises one or more slots for receiving a cooperating portion of the card.

5. A card carrier according to claim 4 wherein each slot is adapted to receive a corner of the card.

6. A card carrier according to claim 4 wherein the slots are offset from corners of the card carrier so as to define a margin within which the machine readable storage means is located.

7. A card carrier according to claim 4 wherein the slots are arranged so as to define a margin with respect to an edge of the card carrier, and the magnetic strip is disposed along the margin.

8. A card carrier for an imprintable card, comprising:
    a. one or more slots adapted and arranged to releasably retain a cooperating portion of an imprintable card;
    b. a strip of magnetic material for alterably storing data retrievable therefrom.

9. The card carrier according to claim 8 wherein the slots are arranged so as to define a margin with respect to an edge of the card carrier, and the magnetic strip is disposed along the margin.

10. An imprintable card and a card carrier, said card having an extending tab portion located along one edge thereof, said card carrier being provided with retaining means for receiving and releasably retaining a cooperating portion of the card, said retaining means being arranged so as to define a margin along an edge of the card carrier, said card carrier being provided with alterable machine readable storage means disposed along the margin, said extending tab portion of the card being adapted and arranged so as to overlay at least a portion of the margin when said cooperating portion of the card is releasably retained by said retaining means.

11. The card and card carrier according to claim 10 wherein said alterable machine readable storage means is disposed along the margin on one face of the card, and the extending tab portion of the card is disposed along the margin on an opposite face of the card.

12. In combination with a card carrier having machine readable storage means disposed thereon and having a margin along one edge thereof, an imprintable card adapted to be releasably retained in the card carrier, the card having an extending tab portion along one edge thereof such that the tab portion overlays at least a portion of the margin when the card is retained in the card carrier, the tab portion providing a visual indication that the card has been correctly placed in the card carrier so as to not cover the machine readable storage means.

13. A method comprising:
 a. providing an imprintable card and a card carrier adapted to receive the card, said card carrier having a machine readable storage medium for alterably storing data retrievable therefrom;
 b. alterably storing information on the machine readable storage medium, and
 c. printing information on the card.

14. Method according to claim 13, including reading the information stored on the machine readable storage medium, updating the information, and storing the updated information on the storage medium.

15. Method according to claim 13 including replacing the stored information on the machine readable storage medium with new information.

* * * * *